United States Patent [19]
Yamada

[11] Patent Number: 4,506,951
[45] Date of Patent: Mar. 26, 1985

[54] PLASTIC LENS

[75] Inventor: Noboru Yamada, Hachioji, Japan

[73] Assignee: Olympus Optical Co., Ltd., Tokyo, Japan

[21] Appl. No.: 409,080

[22] Filed: Aug. 18, 1982

[51] Int. Cl.³ .............................................. G02B 7/02
[52] U.S. Cl. ................................................. 350/253
[58] Field of Search .............................. 350/252–253, 350/310, 409; 372/103

[56] References Cited

U.S. PATENT DOCUMENTS

| | | | |
|---|---|---|---|
| 2,112,316 | 3/1938 | Turner | 350/310 |
| 3,420,603 | 1/1969 | Whilems | 372/103 |
| 3,508,807 | 4/1970 | Mayer | 350/252 |
| 3,555,450 | 1/1971 | Rockwell, Jr. | 350/310 |
| 4,421,386 | 12/1983 | Podgorski | 350/310 |

FOREIGN PATENT DOCUMENTS 151230 10/1981 German Democratic Rep. ..................... 350/253

Primary Examiner—William H. Punter
Attorney, Agent, or Firm—Robert E. Burns; Emmanuel J. Lobato; Bruce L. Adams

[57] ABSTRACT

A plastic lens includes a lens body having effective optical diameter and is mounted in a lens mount by a hold ring which is threaded in the mount. Thin portion is formed outside the lens body and is thinner than minimum thickness of the lens body; end portion is formed outside from and thicker than the thin portion and is adapted to secure the lens with the lens mount and the hold ring. The thin portion absorbs heat stress caused by linear elongation coefficient difference between plastic lens and aluminum lens mount.

25 Claims, 18 Drawing Figures $\widehat{APB} \doteq APB \cdot (1+\alpha t)$ $r_1 > r_2$ $\widehat{AP'B} \doteq \widehat{APB}(1-\alpha t)$

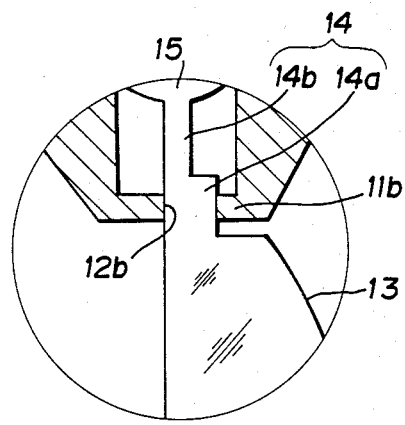
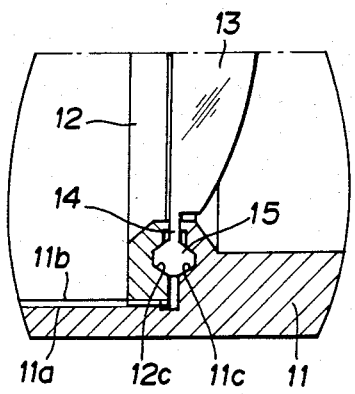
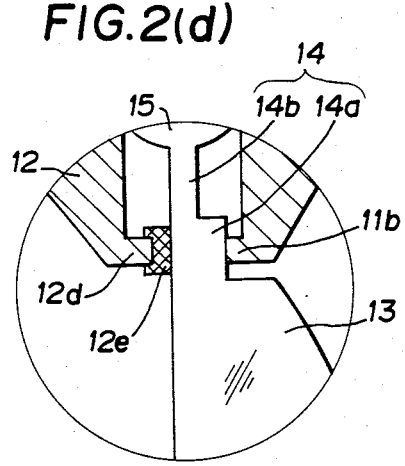
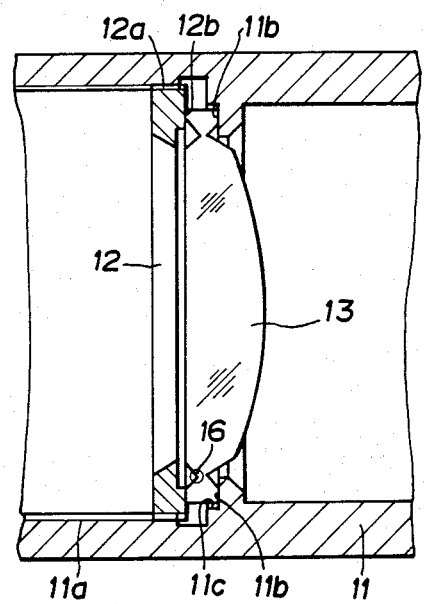

PLASTIC LENS

BACKGROUND OF THE INVENTION

The present invention relates to an optical lens and more particularly to a plastic lens which is adapted to be used in an optical system.

Recently, plastic lenses have been widely used in optical systems, e.g. photographic camera or laser system. At first, the conventional technic to mount a plastic lens in a lens mount will be explained referring to FIG. 1-a to FIG. 1-e.

Referring to FIG. 1-a, to mount a plastic lens 7 in a lens mount 2, the lens 7 is fit in a fitting portion 5 of the lens mount 2 and is urged on a shoulder 4 which is formed by a stepped portion in the lens mount 2. Then a hold ring 1 which has outer thread 6 is threaded in inner thread 3 of the lens mount 2 and is urged against the lens 7 by an abutment 8 which is formed by an inner edge of the ring 1. The clearance between the outer periphery of the lens 7 and the inner surface of the fitting portion 5 is very small to ascertain an accurate optical axis. As the abutment 8 of the ring 1 is urged directly on the lens surface, there is no clearance.

When the assembled lens mount 2 is heated by the atmosphere to a relatively high temperature, the lens 7 and the lens mount 2 expand by thermal expansion. As the linear expansion cofficient of the plastic lens 7 is larger than that of the lens mount 2, the lens 7 expands relative to the lens mount 2 and the clearance at the fitting portion 5 decreases. Also, as the initial clearance between the abutment 8 and the lens surface is zero, the thermal expansion of the lens 7 results in deformation of the lens. As shown in FIG. 1-b, the abutment 8 of the ring 1 digs into the lens surface and the internal diameter of the ring 1 holds the lens 7 at zero clearance.

Thus, when the ambient temperature is increased, the lens expands radially relative to the lens mount. However, the radial expansion is limited by the fitting portion 5 and/or abutment 8 of the ring 1, so that heat stress is produced in the lens. Consequently, the lens deforms its optical axis. As shown in FIG. 1-c, as the lens cannot expand normally to the optical axis, the lens deforms from line APB to line AP'B. Consequently, the radius of curvature of the lens decreases from $r_1$ to $r_2$.

When the ambient temperature decreases from the assembled temperature, the lens contracts relative to the lens mount. However, as the lens is held tightly by the abutment 8 of the ring 1, the lens cannot contract radially. Thus, as shown in FIG. 1-d the lens deforms from line APB to line AP'B, and the radius of curvature of the lens increases from $r_1$ to $r_3$.

As described, when the plastic lens is mounted in a conventional lens mount, the radius of curvature of the lens varies according to ambient temperature so that deviation of the focus position and other adverse effects occur.

FIG. 1-e shows two lenses 21 and 22 inserted by an alignment member 24 which acts to decrease the friction between the two lenses. As a hold ring 25 urges tightly the lenses 21 in a lens mount 23, above mentioned adverse effect at least at higher temperature occurs.

SUMMARY OF THE INVENTION

Accordingly, an object of the present invention is to provide a plastic lens having an integrally formed portion which self absorbs heat stress caused by the linear expansion coefficient difference between the plastic lens and lens mount.

According to the present invention, a plastic lens adapted to be mounted in a lens mount by a hold ring both made of material having a different linear expansion coefficient from that of the lens, comprises a lens body having an effective optical diameter, characterized by a thin portion formed integral with the lens body radially outside the effective diameter of the body and thinner than the minimum thickness of the lens body, and an end portion radially outside from and thicker than the portion and adapted to be removably held between the lens mount and the hold ring, whereby said thin portion absorbs internal stress produced in the lens.

By integrally forming this portion radially outside the lens body, heat stress produced in the lens is absorbed by deformation of the thin portion without causing adversely affecting the lens body. Thus, optical properties of the lens are maintained.

The thin portion of the lens may be formed as an annular disc around the lens body or as radial spokes projected from the periphery of the lens body.

The thin portion may be formed by one or more recesses, e.g. V-shaped grooves, on one or both side surfaces of the lens radially outside from the lens body.

The end portion may be formed by a peripheral ring of circular or rectangular cross section.

These and other objects and advantages of the present invention will become apparent from the following description taken in connection with the accompanying drawings. In the drawings, the same reference numerals are used to show same or similar parts or portions for sake of clarity only.

BRIEF DESCRIPTION OF THE DRAWINGS

FIG. 1-a to FIG. 1-e show conventional lens systems in which:

FIG. 1-a is an illustrative cross section of a conventional lens system;

FIG. 1-b is an enlarged detail of the portion A shown in FIG. 1-a;

FIG. 1-c is a diagram showing deformation of the lens shown in FIG. 1-a at high temperature;

FIG. 1-d is a diagram showing deformation of the lens at low temperature;

FIG. 1-e is a cross section of another conventional lens system;

FIG. 2 to FIG. 11 show lens systems utilizing a plastic lens according to the present invention in which:

FIG. 2-a is an illustrative cross section of a lens system according to one embodiment of the present invention;

FIG. 2-b is an enlarged detail of the portion B shown in FIG. 2-a;

FIG. 2-c is an enlarged detail of the portion C of FIG. 2-b showing another embodiment of the present invention;

FIG. 2-d is similar to FIG. 2-c but showing a modification of FIG. 2-c;

FIG. 3 is a portion of FIG. 2-a but showing a modification of FIG. 2-a;

FIG. 4 is an illustrative cross section of a lens system according to further embodiment of the present invention;

FIG. 5 is an illustrative cross section of a lens system according to another embodiment of the present invention;

FIG. 6 is a side view of the lens shown in FIG. 5;

FIG. 7 is a cross section of the modification of the lens shown in FIG. 5;

FIG. 8 is a side view of a lens according to further embodiment of the present invention;

FIG. 9 is an illustrative cross section of a lens system according to another embodiment of the present invention;

FIG. 10 is a cross section of a portion of a lens system according to still further embodiment of the present invention; and FIG. 11 is simiar to FIG. 10 but showing a modification of FIG. 10.

DETAILED EXPLANATION OF PREFERRED EMBODIMENTS

Figure 1A:
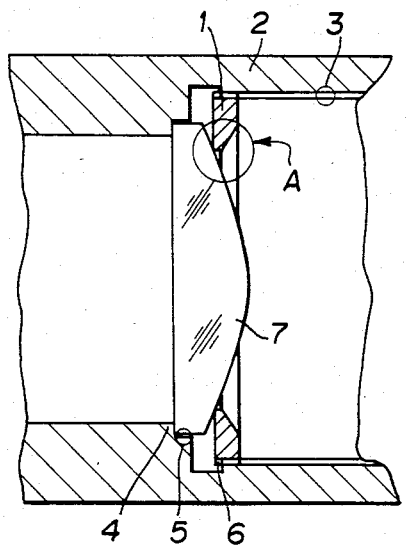
Figure 1B:
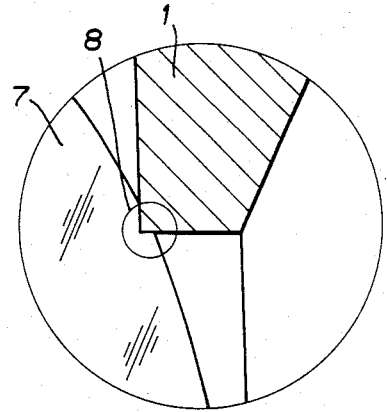
Figure 1C:
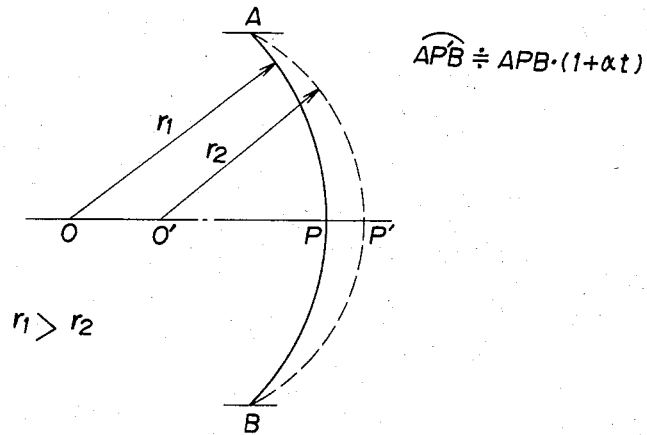
Figure 1D:
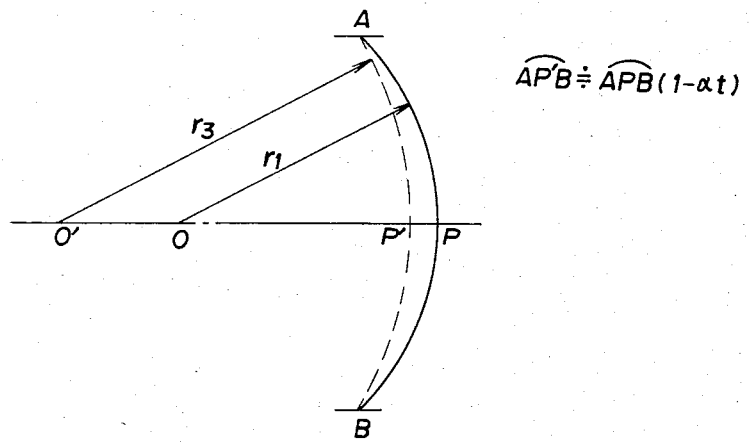
Figure 1E:
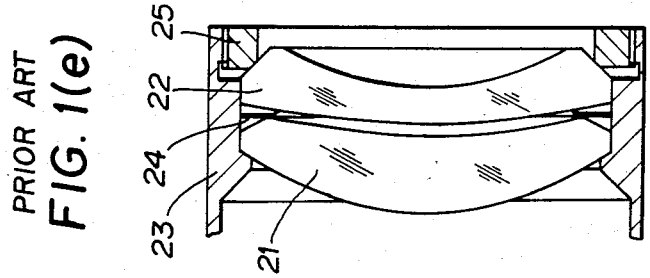
Figure 2A:
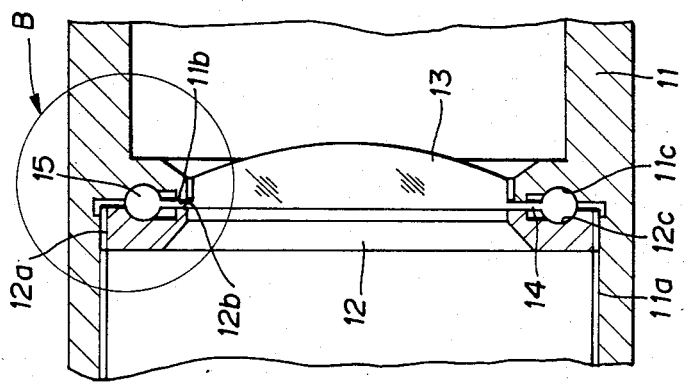
Figure 2B:
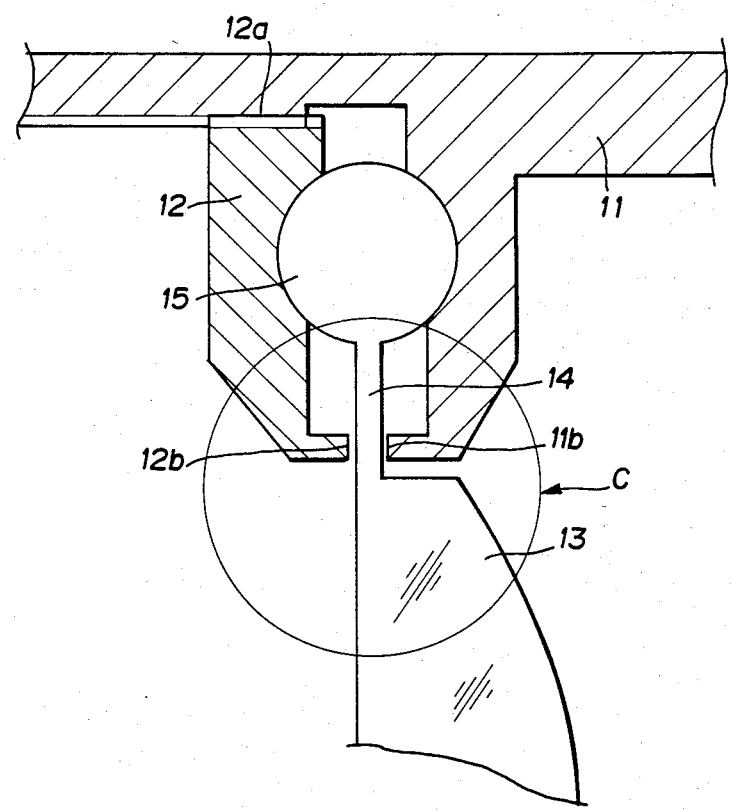

Referring now to FIG. 2-a, a lens mount 11 has an internal thread 11a, and a lens-holding portion comprised of an abutment 11b and a recessed lens fitting portion 11c. A hold ring 12 also has an outer thread 12a, and a lens-holding section comprised of an abutment 12b and a recessed lens fitting portion 12c. A lens 13 according to the present invention has an annular peripheral ring or mounting portion 15 of generally circular cross section and a thin connecting wall portion 14 integrally connecting the peripheral ring 15 with the lens body.

The lens 13 is inserted in the lens mount 11 and the hold ring 12 is mounted to hold the lens 13 between the lens mount 11 and the ring 12. The lens 13 is removably held by the peripheral ring or mounting portion 15 which is positioned or sandwiched between the lens fitting portions 11c and 12c.

FIG. 2-b shows the detail of portion B of FIG. 2-a. As shown, the thin wall portion 14 is thinner than the minimum thickness of the lens body 13 so that heat stress produced in the lens 13 concentrates in the thin wall portion 14 to deform the portion 14. Thus, the main body of the lens is not deformed by ambient temperature changes. The abutments 11b and 12b form small clearances with the thin wall portion 14 to allow such thermal deformation. The abutments 11b and 12b act to prevent shift or tilt of the lens body 13 caused by deformation of the thin wall portion 14.

FIG. 2-c shows another preferred embodiment in which the thin wall portion 14 shown in FIG. 2-a is modified to form a rather thick positioning portion 14a and rather thin portions 14b. The abutments 11b and 12b act as lateral positioning members for the lens body. The clearances between the abutments 11b and 12b and the thick portion 14a are determined to allow relative sliding only by thermal expansion or contraction. The deformation is performed only by thin portion 14b.

As shown in FIG. 2-d, an elastic pad 12e may be inserted between the positioning portion 14a and the abutment 12d of the hold ring 12. Thus, the abutment 11b of the lens mount 11 can determine accurate positioning of the lens body 13 by absorbing the clearance between the abutment 11b and the lens surface. The elastic pad 12e may be attached on the abutment 11b.

The thin portion 14 and the peripheral ring 15 may be formed by a material other than that of the lens body 13 and are formed integrally therewith by double forming process. Thus desired properties independent from the optical property of the lens body 13 can be given to the thin portion 14.

The shape of the thin portion 14 is not limitted to those shown in FIGS. 2-a to 2-d. Essentially the thin portion 14 or 14b allows radial material slide by heat expansion or contraction without affecting other portions of the lens. The thickness of the positioning portion 14a should be thicker than the thinnest portion 14b and thinner than thinnest portion of the lens body itself.

When the assembly of the lens mount 11 and the lens 13 is located in higher ambient temperature, compression thermal stress is produced in the lens 13 by the difference between the linear expansion coefficients of the lens mount 11 and the plastic lens 13. Maximum thermal stress in the thin portion 14 or 14b results in deformation of the thin portion. Thus the lens body 13 itself does not deform by the thermal stress. Shift or tilt of the optical axis caused by non-uniform deformation of the thin portion 14 or 14b is suppressed by the abutments 11b and 12b which nearly contact with the flat surfaces of the thin connecting portions 14 or positioning portion 14a of the lens 13. The minimum inside diameter of the lens mount 11 is sufficiently larger than the outside diameter of the lens body 13 itself to allow free relative expansion of the lens body.

As described, by forming thin portion 14 or 14b at the peripheral portion of the lens 13, thermal stress produced in the lens 13 is effectively absorbed by deformation of the thin portion, and no adverse effect is produced in the lens body itself.

FIG. 3 shows another embodiment of the present invention, in which the peripheral ring or mounting portion 15a of the lens 13 is formed with a polygonal cross section. Thus, slight manufacture tolerance of the fitting portions 11c and 12c of the lens mount 11 and the hold ring 12 can be absorbed.

FIG. 4 shows a further embodiment of the present invention, in which V-shaped grooves 16 are formed on both surfaces of the peripheral portion of the lens 13 to form the thin portion. Abutments 11b and 12b of the lens mount 11 and the hold ring 12 hold the outermost portion of the lens 13 by tightening of the ring 12. When thermal stress is produced in the lens 13, the highest thermal stress in the thin portion between the grooves 16 causes deformation of the portion such that the angle of V of the groove is decreased. Thus the lens body itself is not affected. The form of the grooves is not limited to the V shape shown in FIG. 4, and other forms, e.g. U shape, trapezoidal or W shape, may be used as desired to form the thinnest portion of the lens at the peripheral portion.

Figure 5:
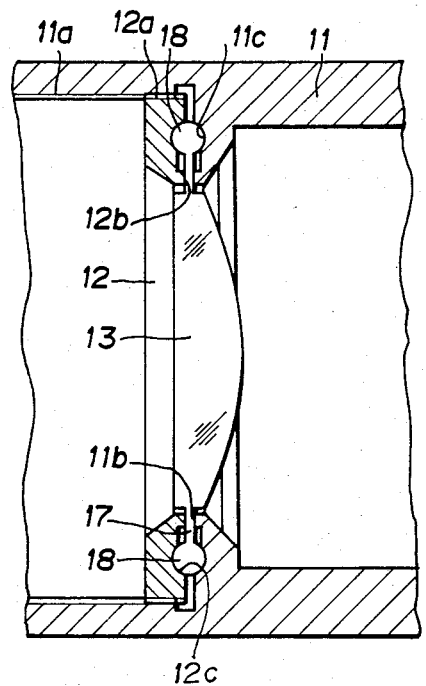
Figure 6:
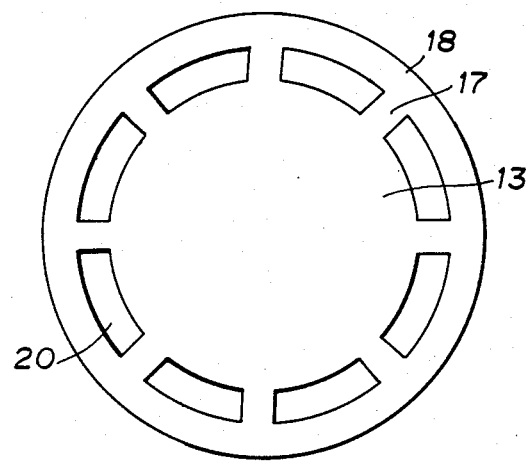
Figure 7:
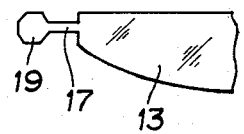

FIGS. 5 and 6 show another embodiment of the present invention. The lens 13 includes an outermost peripheral ring 18 of circular cross section and a thin portion 17 formed between the peripheral ring 18 and the lens body 13. The thin portion 17 has circumferentially spaced openings 20 to form spokes 17. The peripheral ring 18 is held between the fitting portions 11c and 12c of the lens mount 11 and the hold ring 12 as before. The abutments 11b and 12b maintain the positioning of the lens 13. The peripheral ring 18 may be formed with a polygonal cross section shown as ring 19 in FIG. 7. The cross section of the spoke 17 may be selected as desired, e.g. square, polygonal, circular or semi-circular. The cross sectional dimension of the spoke 17 may be varied along the radial direction of the lens.

Figure 8:
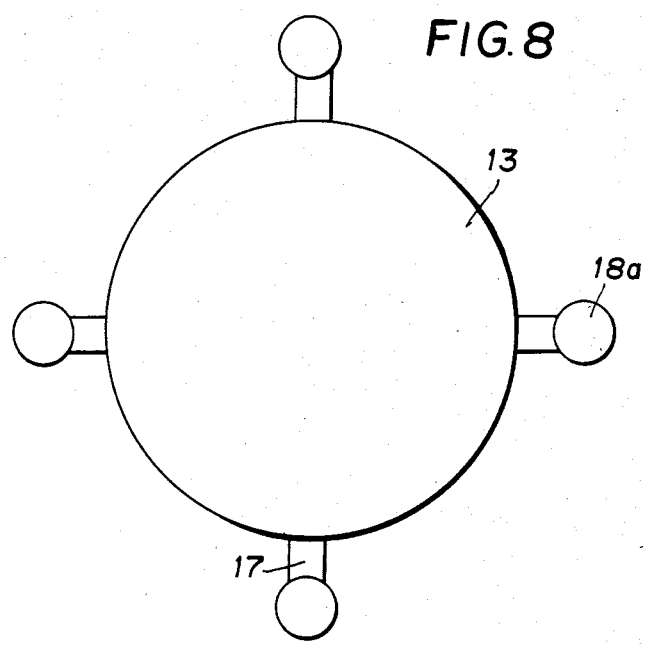

In the embodiment shown in FIG. 8, the peripheral ring 18 shown in FIGS. 5 and 6 is circumferentially separated to form end spheres 18a each of which is continuous with each spoke 17.

Figure 9:
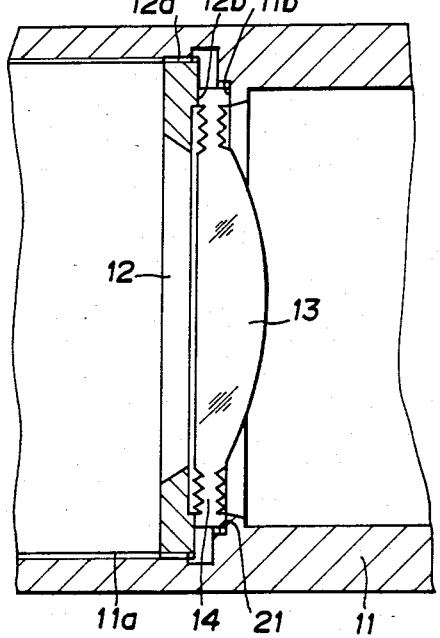

In the embodiment shown in FIG. 9, a thin portion 14 of the lens 13 is formed by a plurality of V-shaped grooves 21 on both side surfaces of the peripheral portion of the lens 13. Similar to the embodiment shown in FIG. 4, abutments 11b and 12b of the lens mount 11 and the hold ring 12 hold the outermost peripheral portion of the lens 13 tightly. The depth of the V-shaped grooves 21 is determined to absorb thermal stress of the lens and to prevent lateral deformation of the lens. The grooves 21 may be concentrically machined or helically machined as desired.

Figure 10:
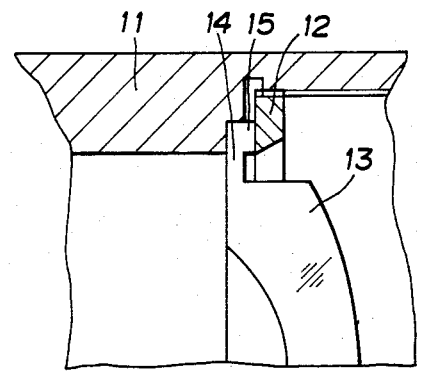
Figure 11:
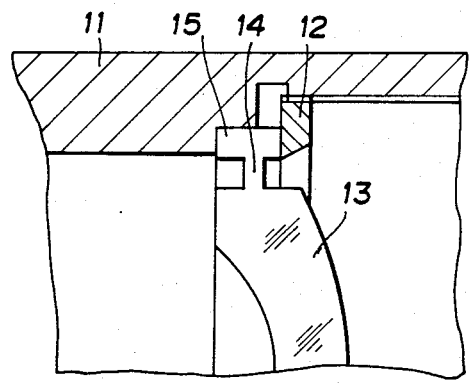

In the embodiments shown in FIGS. 10 and 11, the lens 13 also forms thin portion 14 and the peripheral portion 15. As shown the peripheral ring 15 has a rectangular cross section and is held between plain surfaces of the lens mount 11 and the hold ring 12. Thus, machining of the lens mount 11 and the hold ring 12 is easy compared with the embodiment shown in FIG. 2. The position of the thin portion may be at axial end portion of the lens body 13 as shown in FIG. 10 or at an axial middle position as shown in FIG. 11.

It will be appreciated that by forming the thin portion outside the effective diameter of a plastic lens and thinner than the minimum thickness of the lens body, and by mounting the lens to a lens mount through a peripheral thick portion outside the thinner portion, thermal stress produced in the lens is effectively absorbed without causing adverse effects.

Further, Newton rings of such plastic lens before mounting are normally two or three in number. By securing the lens by conventional process, the Newton rings are ten or more, and/or irregular rings appear by mechanical stress caused by the hold ring. As to the lenses shown in the embodiments according to the present invention, the Newton rings are not changed after the mounting.

While preferred embodiments have been shown and described, the present invention is not limited to such embodiments which are to be considered as exemplary of the principles of the invention. The scope of the invention will be measured by the appended claims and their equivalents.

What is claimed is:

1. A plastic lens for mounting in a lens mount by a hold ring both made of material having a different linear expansion coefficient from that of the lens, comprising: a lens body having an effective optical diameter, a thin portion integral with the lens body radially outside the effective diameter of the lens body and being thinner than the minimum thickness of the lens body, and an end portion integral with the lens body radially outside from and thicker than the thin portion and configured to be removably held between the lens mount and the hold ring, whereby said thin portion is effective to absorb internal stress produced in the lens.

2. A lens as claimed in claim 1, wherein said thin portion comprises an annular disc around the lens body.

3. A lens as claimed in claim 1, wherein said thin portion has one or more recesses on one or both side surfaces of the lens radially outside from the lens body.

4. A lens as claimed in claim 1, wherein said thin portion comprises a plurality of radial spokes projected from the outer periphery of the lens body.

5. A lens as claimed in claim 1, wherein said end portion comprises a peripheral ring.

6. A lens as claimed in claim 5, wherein said peripheral ring has a generally circular cross section.

7. A lens as claimed in claim 5, wherein said peripheral ring has a rectangular cross section.

8. A lens as claimed in claim 2, wherein said annular disc includes a plurality of circumferentially spaced openings.

9. A lens as claimed in claim 3, wherein said recess comprises a V-shaped groove.

10. A lens as claimed in claim 4, wherein said end portion comprises a spherical end portion at the radial outer end of each said spoke.

11. A lens as claimed in claim 1, wherein said thin portion comprises a radially inner thick disc-like portion and a radially outer thin portion.

12. A lens as claimed in claim 11, wherein said radially inner thick disc-like portion is dimensioned to be axially held between a portion of the lens mount and a portion of the hold ring.

13. A lens as claimed in claim 1, wherein the lens body has a curved radius of curvature.

14. A lens assembly comprising: a hollow lens mount having a lengthwise extent and having along its interior a radially inwardly extending lens-holding portion; a hold ring removably inserted lengthwise into the interior of the hollow lens mount and having on one side thereof a lens-holding section; and a plastic lens disposed within the interior of the hollow lens mount and removably held in place in sandwiched relationship between the lens-holding portion of the lens mount and the lens-holding section of the hold ring, the plastic lens having a linear expansion coefficient different from that of the lens mount and the hold ring, and the plastic lens comprising a lens body portion having an effective optical diameter, a mounting portion removably sandwiched between the lens-holding portion of the lens mount and the lens-holding section of the hold ring, and a connecting portion extending radially outwardly of the lens body portion and being integrally connected at its radial inner end to the lens body portion and at its radial outer end to the mounting portion, the connecting portion having a thickness in the lengthwise direction which is less than the minimum thickness of both the lens body and lens mounting portions and which is effective to enable the connecting portion to undergo thermal deformation in response to changes of temperature thereby preventing deformation of the lens body portion.

15. A lens assembly according to claim 14, wherein the plastic lens comprises an integral one-piece structure.

16. A lens assembly according to claim 14, wherein the lens-holding portion of the lens mount and the lens-holding section of the hold ring have surface portions which complement the shape of and engage with the lens mounting portion.

17. A lens assembly according to claim 16, wherein the plastic lens mounting portion has a generally circular cross section.

18. A lens assembly according to claim 16, wherein the plastic lens mounting portion has a generally rectangular cross section.

19. A lens assembly according to claim 16, wherein the plastic lens mounting portion has a generally polygonal cross section.

20. A lens assembly according to claim 16, wherein the lens mount lens-holding portion and the hold ring lens-holding section have at their radial outer ends lengthwise extending abutments which extend toward one another and define a small clearance with the lens connecting portion to accommodate thermal deformation thereof while effectively preventing tilting of the lens body portion.

21. A lens assembly according to claim 16; wherein the lens connecting portion comprises an annular disc.

22. A lens assembly according to claim 21; wherein the annular disc has at least one recess on at least one side thereof.

23. A lens assembly according to claim 21; wherein the annular disc has a plurality of recesses on both sides thereof.

24. A lens assembly according to claim 16; wherein the lens connecting portion comprises a plurality of radial spokes.

25. A lens assembly according to claim 24; wherein the lens mounting portion comprises a spherical portion at the radial outer end of each spoke.

* * * * *